United States Patent [19]
Rioman

[11] 3,760,857
[45] Sept. 25, 1973

[54] ANTI-SKID DEVICE

[76] Inventor: Geneviève Antoinette Rioman, Villa Doux-Repos Montee des Bergers Domaine Princesse Zita, 06 Mandelleu, France

[22] Filed: Aug. 25, 1971

[21] Appl. No.: 174,757

[30] Foreign Application Priority Data
Aug. 27, 1970 France .............................. 7031348

[52] U.S. Cl. .............................................. 152/226
[51] Int. Cl. .......................................... B60c 27/04
[58] Field of Search ................... 152/226, 225, 222, 152/229, 226

[56] References Cited
UNITED STATES PATENTS
| 2,738,820 | 3/1956 | Browning et al. ............... 152/225 C |
| 2,900,003 | 8/1959 | Nelson .......................... 152/225 C |
| 2,589,207 | 3/1952 | Welsh, Jr. ........................... 152/225 |

*Primary Examiner*—James B. Marbert
*Attorney*—William A. Drucker

[57] ABSTRACT

An anti-skid device the type comprising a plurality of shoes which are capable of being readily attached to and removed from a wheel on which a tyre is mounted, the shoes having resilient lateral limbs, and transverse limbs which extend across the tyre tread and serve to minimise or prevent skidding on slippery road surfaces.

5 Claims, 12 Drawing Figures

PATENTED SEP 25 1973

ANTI-SKID DEVICE

It is known that snow chains mounted on the wheels of a vehicle may be formed from a number of link-chains. Such chains are difficult to use, due to the considerable time required to fit them and a considerable risk of dirtying the user.

Shoe devices have, therefore, been proposed which resiliently fasten over the rim of the wheels. Some shoe devices further include a circular lateral tie, whereas others merely comprise independent clips having two fastening limbs on each side of the type. The latter type of shoe basically comprises a sole which extends transversely with respect to the tyre tread, and in this sole is arranged lever arms articulated with respect to the sole, in such a manner that, under the weight of the wheel, the lateral arms of the levers are pressed against the rim to which they clip by means of hooks. It has also been attempted to replace the levers by a central inset strip of steel, the tyre crushing the median part of the strip. These different designs of anti-skid shoes all possess the same drawbacks. They incorporate a sole containing reinforcing means for the lateral pressure of the hooks. The positioning of a plurality of soles makes the tyre heavy due to the creation of unbalance. When the shoes move to an uppermost position, the vehicle vibrates considerably which strictly limits the possible speed on frosty or snowy roads. Moreover, the soles damage the tyres or break up easily due to shocks.

It has therefore been proposed to use simple clips comprising strong leaf springs, but then there is no longer any gripping pressure in contact with the ground, and the clips may become detached, or move, during travel.

The invention overcomes these drawbacks. It provides a device which enables the shoes to be automatically fastened when they are arranged on the ground, and move upwardly as the wheel is rotated, without other manual intervention. It permits a high rotational speed without the shoes becoming disconnected or displaced, and the shoes are very supple and elastic, enabling them to follow any unevenness in the running surfaces. Finally the design of the shoes according to the invention is economical and they can be produced industrially on a large scale.

According to the present invention, there is provided an anti-skid device for attachment to a wheel of a vehicle, of the type including a plurality of shoes, each comprising a stirrup having resilient limbs capable of embracing the section of a tyre and gripping the rim of the wheel on which the tyre is mounted, by means of lateral hooks when the tyre rests in the stirrup, wherein the stirrup includes two generally parallel resilient collars, each in the form of a loop terminated at both ends by eyelets which, in use of the device, are located approximately halfway up the side of the tyre, the eyelets being linked by a spindle on which a locking lever arrangement pivots, which has, on opposite sides of the spindle, two limbs forming an obtuse angle therebetween, the limb which, in use of the device, extends from the side of the spindle directed towards the wheel rim, being provided with a hook for engagement with the wheel rim, and the limb which, in use of the device, extends from the other side of the spindle, having a support member engageable with the side of the tyre.

Thus, with respect to known devices, the positioning of the pivots of the spring forming the hooks are displaced laterally, the pressure acting on the locking lever arrangements being obtained by the lateral inflation or deflection of the part of the tyre which is compressed against the ground. This enables the central limb of the stirrup, which forms the sole, to be completely released from any means, so that this limb may have a maximum suppleness and resilience.

Preferably, the resilient collars are made from circular section sprung wires held parallel by cross-pieces and covered with a sprung wire having close turns.

The collars may be C-shaped with a substantially rectilinear central part which engages the ground, whilst the curved parts of each side are independently resilient and are joined in parallel by cross-pieces.

An additional anti-skid surface which completes the shoe may be attached between the parallel collars.

In order that the invention may be more readily understood, various embodiments thereof will now be described with reference to the accompanying drawings, in which.

Figure 1:
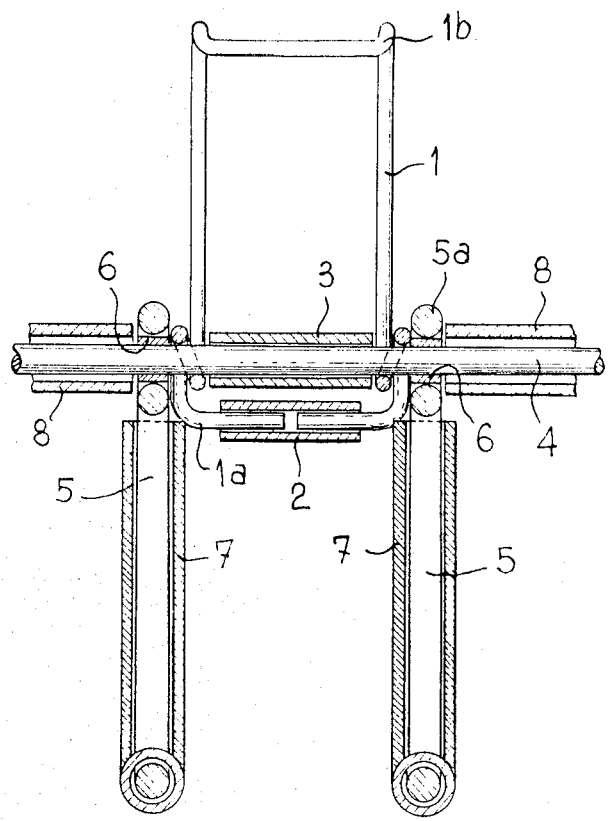
FIG. 1 is a side view, partially in section, of a first embodiment of a shoe.
Figure 4:
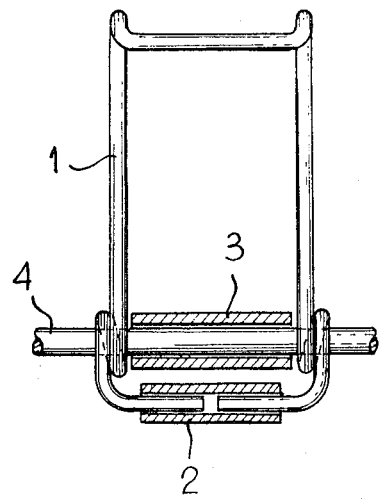
FIG. 4 is a side view of the locking lever arrangement.
Figure 4A:
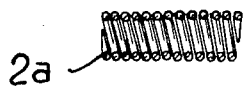
FIG. 4a is a fragmentary view of the support sleeve of the locking lever arrangement.

Referring to FIG. 1, the shoe includes a clip or clamp 1 made from a high tensile steel, which forms with its lower part 1a a locking lever arrangement intended to rest on the side wall of a tyre. In order to avoid wear due to rubbing, the part 1a is fitted with a sleeve 2 formed either by a sheath of plastics material (FIG. 1) or by a sheath made from steel wire wound into a coil 2a having close turns (FIG. 4a). A hook 1b is located on the upper part of the clamp 1 enabling the shoe to be automatically hooked onto the edge of the recess of the rim of the wheel (see FIG. 8).

A cross-piece 3 maintains constant the spacing between the two parallel limbs forming the clamp 1. This cross-piece may be formed by a sleeve of plastics material or by a sheath of steel wires wound into a coil having close turns. The clamp 1 may be mounted on a spindle formed by a steel cable 4 as is employed in known devices.

A collar 5 encircling the tyre is mounted on the spindle 4, one on each side of the clamp 1. Each collar 5 is made of circular section steel of high resistance and elasticity. A steel sleeve or bush 6 which enables free passage of the spindle or cable 4 is encased in the eyelets 5a of the collar, which are, in use, located halfway up the side of the tyre.

Figure 5:
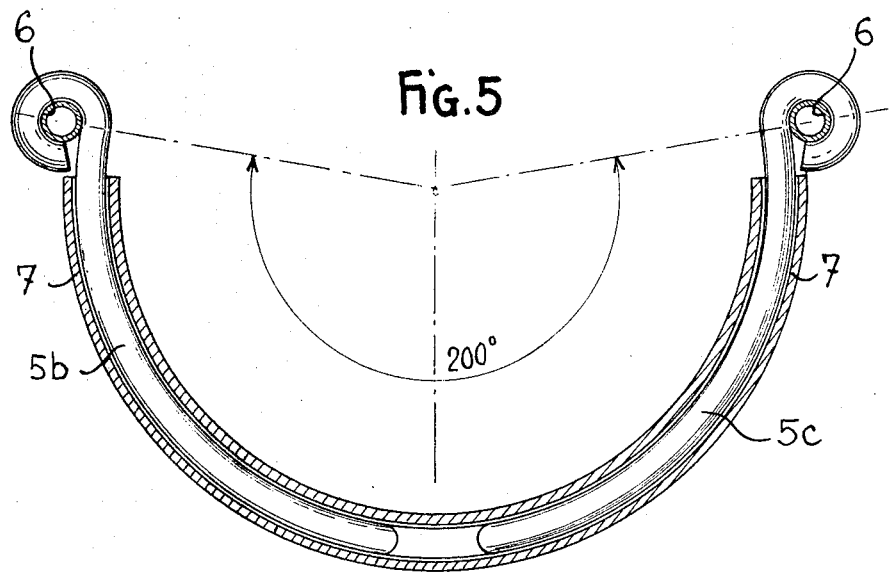
FIG. 5 shows a modified design of collar.

Two types of collar may be employed, namely either a collar made in one piece 5 (FIG. 2), or a collar made from two resilient members 5b, 5c (FIG. 5). In the second case, a rapid connection may be effected between the two members by means of a simple steel spring 7 having close turns mounted on the upper members against the eyelets 5a.

Another embodiment of collar will be described hereinafter.

Figure 2:
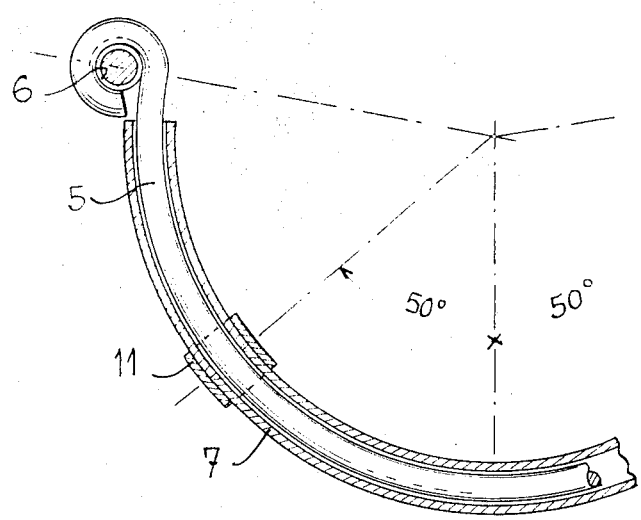
FIG. 2 is a fragmentary front view, partially in section, of the spring clip of the collar.
Figure 3:
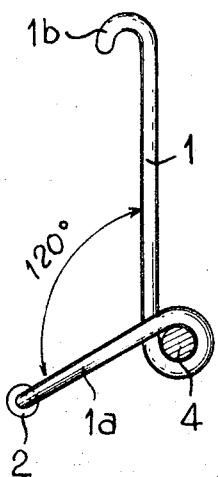
FIG. 3 is a front view of the locking lever arrangement.

The transverse spacing of the two parallel collars 5 is maintained in all the cases by two members 11 (one of which is shown in FIG. 2) fixed in the closely wound springs 7.

Figure 6:
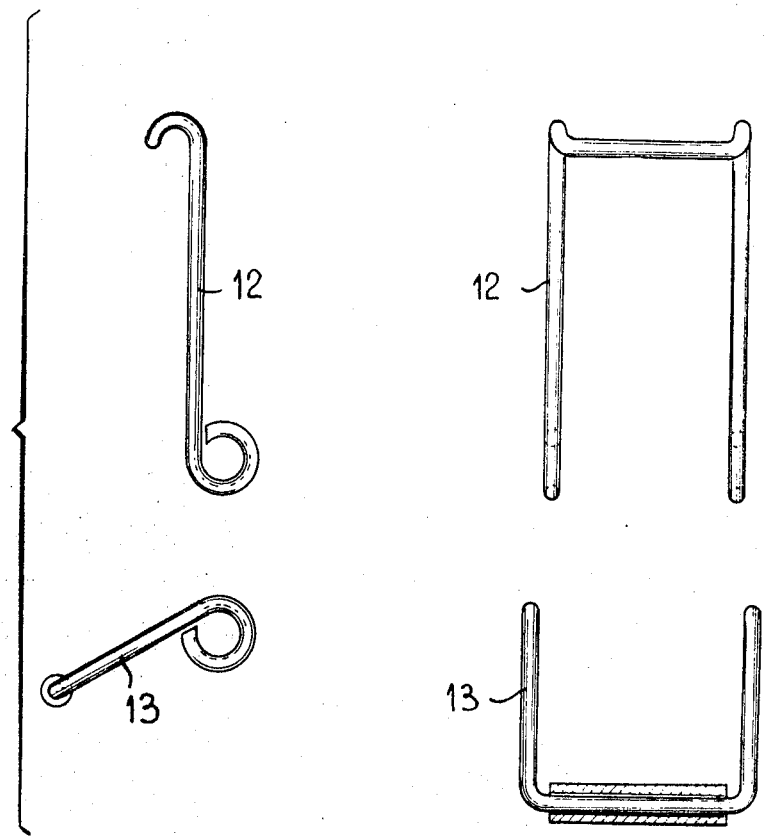
FIG. 6 shows a modified design of locking lever arrangement.
Figure 7:
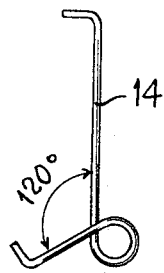
FIG. 7 shows the spring for use with the arrangement of FIG. 6.

In the modified locking lever arrangement down in FIGS. 6, 7, the clamp 1 incorporates a closing hook 12 engageable with the wheel rim, and a support member 13 which is engageable with the side wall of the tyre, both independently pivoted on the spindle 4. These two separate members are held in their operative positions by the spring 14 shown in FIG. 7, which also serves as a spacer cross-piece for the clamps.

If a circular cable 4 is used as the spindle for the clamps (FIG. 1), sleeve sections 8 maintain the spacing of the interconnected stirrups constituted by the pair of collars 5, which stirrups, for example eight in number, are distributed around the wheel.

Figure 8:
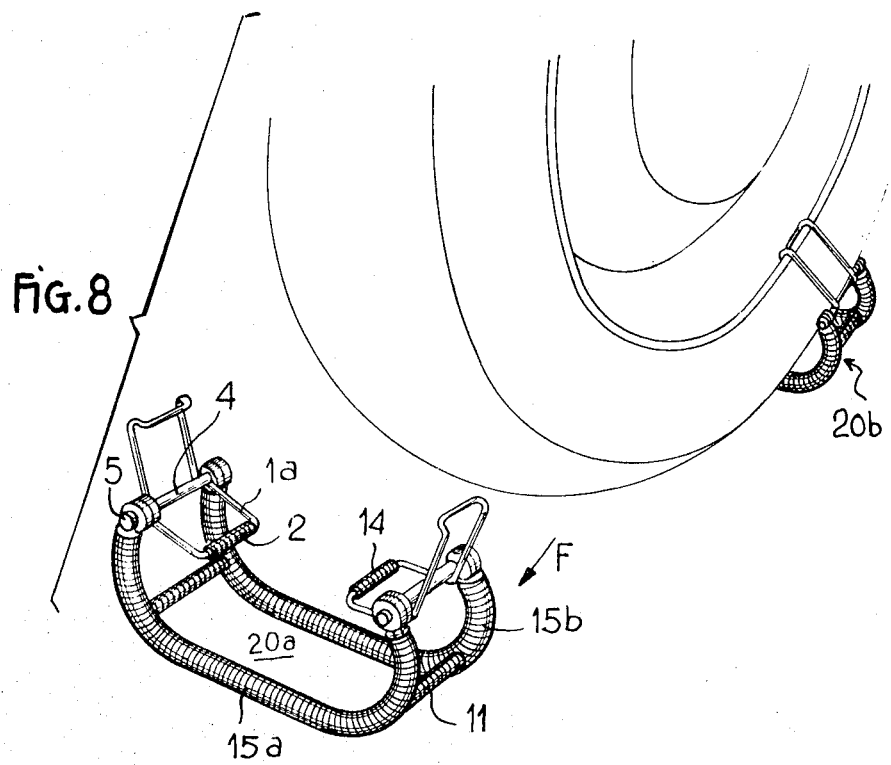
FIG. 8 is a perspective view of a second embodiment of shoe, and its assembly to a wheel.

In the FIG. 8 embodiment separate shoes are used, mounted individually, one behind the other, around the wheel. A set of collars 20a is positioned on the ground in line with and in front of the tyre, which tyre enters the collars when advanced in the direction of the arrow F. A second set of collars is shown already fixed by its lateral hooks to the wheel rim in the manner just explained. The set of collars 20a comprises two parallel collars 15a and 15b in the shape of a "C," the central part of which is substantially rectilinear, and rests on the ground under the pressure of the tyre. It is known, in fact, that under the weight of the vehicle, a tyre inflated to its proper pressure assumes a somewhat crushed shape in contact with the ground; thus the "C" shape of the limbs of the collars adapts itself to a maximum in order to grip the tyre. The two collars 15a and 15b are interconnected by two cross-pieces 11 holding them parallel. As hereinbefore described, the collars have eyelets 5a at their ends containing a spindle 4 on which the hooks 1a pivot. These hooks 1a may be provided with a lengthening device (not described) enabling adaptation of the shoe to a variety of vehicle wheels.

Figure 9:
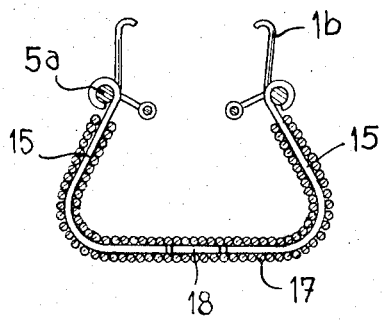
FIG. 9 is a front view, partially in section, of the shoe of FIG. 8.
Figure 9A:
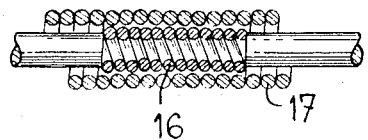
FIG. 9a is a detail of the collar shown in FIG. 9.

According to FIG. 9, each collar is made from three web parts which impart more suppleness thereto than a usual holding spring having close turns. The two curved parts 15 of the side limbs of the collar are made from a steel wire, for example, 3 mm. in diameter. At the centre, there is an independent rectilinear steel rod part 18, whilst the assembly of the collar is held by a wire spring 17 wound with close turns over the steel wires. In order to further improve the quality of elasticity, according to FIG. 9a, the central web part 18 is replaced by an internal spring 16 wound in the opposite sense to the spring 17. The cross-pieces 11 are also made from a wire springs having close turns.

Figure 10:
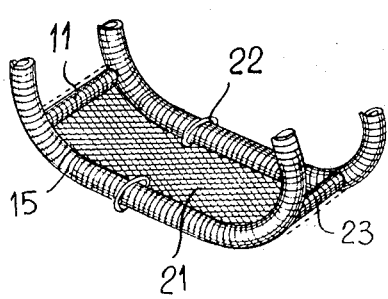
FIG. 10 is a fragmentary perspective view of a shoe having an additional mesh surface.

For extremely slippery road surfaces, such as ice or frosty surfaces, the device can be supplemented by a metal sheet, grid, or a toothed surface 21, which, as shown in FIG. 10, is positioned between the collars 15. The anti-skid surface 21 can be attached by side clips such as 22, and connectors 23 fixed to the cross-pieces 11.

The device shown in FIGS. 8 and 9 is a preferred embodiment, due to the noteworthy advance which it achieves. The "C" limb of each collar, on account of its construction and its better adaptation to the surface of the tyre which engages the ground, has two advantages. Firstly, when the tyre is engaged, upon assembly, between the limbs, progressive separation of the spindles 4 occurs, whereafter the tyre acts on the arms 1a of the locking lever arrangement to effect the engagement of the lateral hooks with the wheel rim. Thus attachment is achieved in half the time and in an easier manner. Secondly, the extremely resilient structure due to the springs prevents permanent deformation of the shoe, which deformation could lead to dislocation of the device. Thus the shoe may be employed at higher speeds than hitherto known devices.

What is claimed is:

1. In an anti-skid device for attachment to a wheel of a vehicle, of the type including a plurality of shoes, each comprising a stirrup having resilient limbs capable of embracing the section of a tire and gripping the rim of the wheel on which the tire is mounted, by means of lateral hooks when the tire rests in the stirrup, the improvement in which the stirrup includes two generally parallel resilient collars, each in the form of a loop terminated at both ends by eyelets which, during use of the device, are located approximately halfway up the side of said tire, the eyelets being linked by a spindle on which a locking lever arrangement pivots, and opposite sides of the spindle, two limbs forming an obtuse angle therebetween, the limb which during use of the device, extends from the side of the spindle directed towards the wheel rim, being provided with a hook for engagement with the wheel rim, and the limb which, during use of the device, extends from the other side of the spindle, having a support member engageable with the side of the tire.

2. A device according to claim 1, wherein the collars comprise circular-section sprung wires held parallel by cross-pieces, each wire being covered by a spring having close turns.

3. A device according to claim 2, wherein the cross-pieces are formed from springs having close turns.

4. A device according to claim 1, wherein the collars are generally C-shaped, having a generally rectilinear central part intended to grip the ground, whilst the limbs are made from a web of sprung wire in several parts covered by a spring having close turns.

5. A device according to claim 1, wherein an additional anti-skid surface is secured between the collars.

* * * * *